H. S. TERRY.
HAND BUNDLE TYING MACHINE.
APPLICATION FILED SEPT. 12, 1918.

1,316,002.

Patented Sept. 16, 1919.
6 SHEETS—SHEET 1.

Witnesses

Inventor
H. S. Terry
By D. Swift & Co.
Attorneys

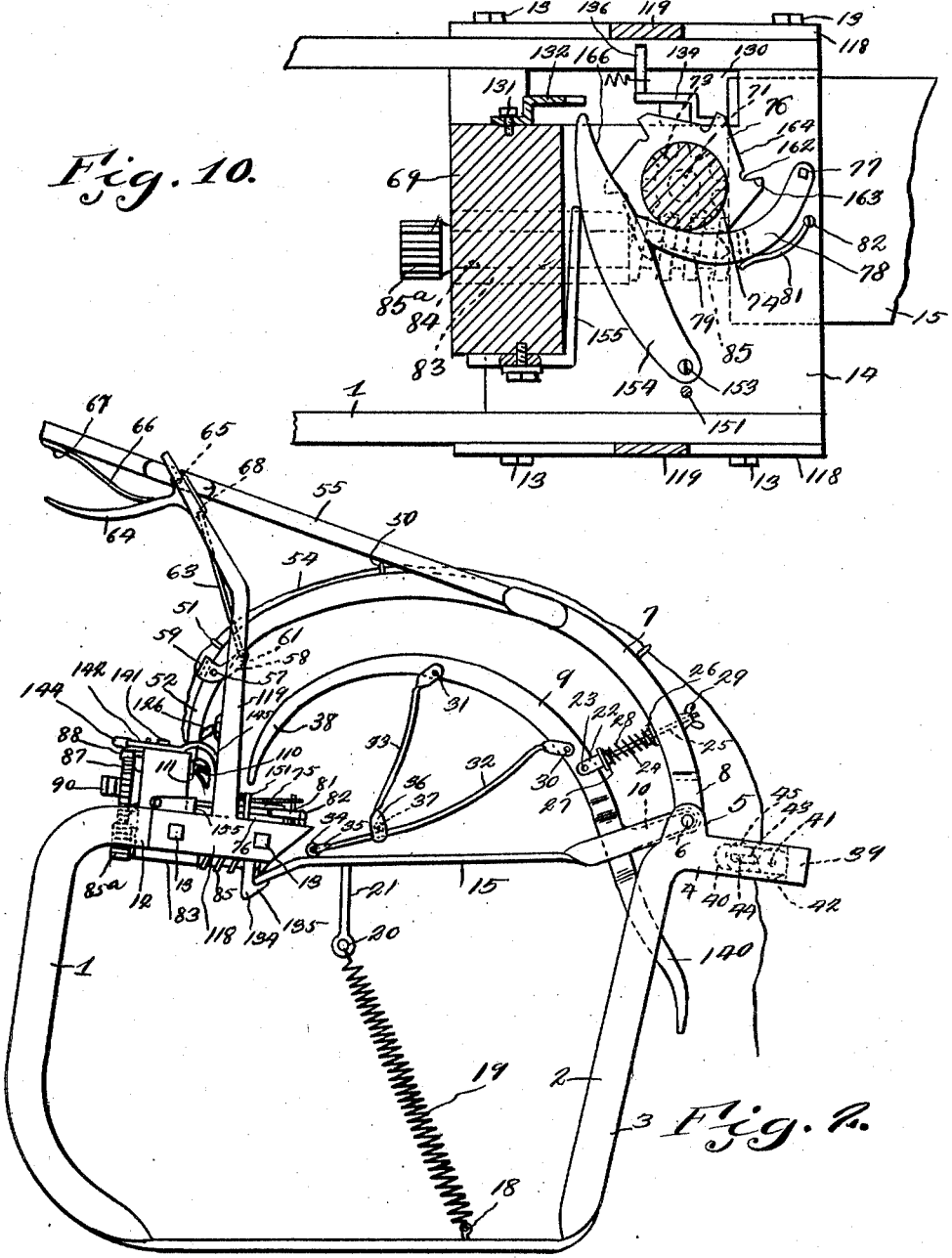

H. S. TERRY.
HAND BUNDLE TYING MACHINE.
APPLICATION FILED SEPT. 12, 1918.
1,316,002.
Patented Sept. 16, 1919.
6 SHEETS—SHEET 3.
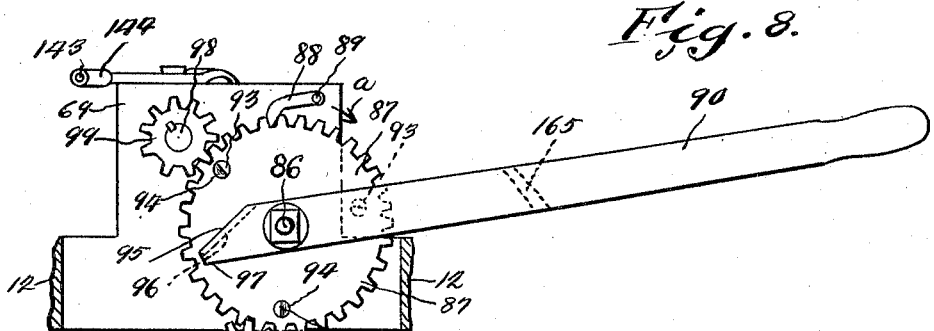
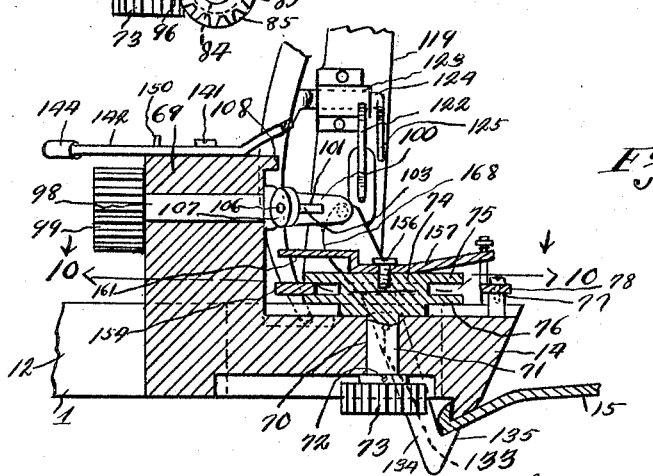
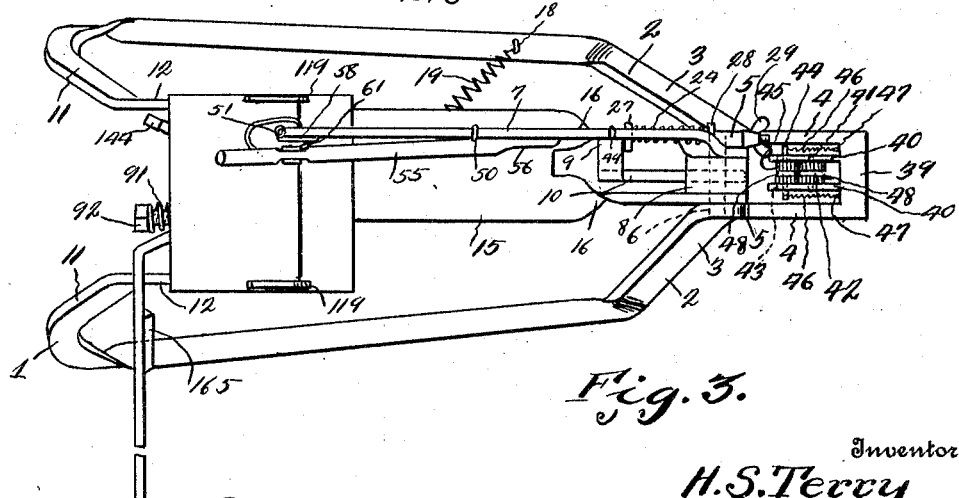
Witnesses
Inventor
H. S. Terry
By D. Swift & Co.
Attorneys H. S. TERRY.
HAND BUNDLE TYING MACHINE.
APPLICATION FILED SEPT. 12, 1918.
1,316,002.
Patented Sept. 16, 1919.
6 SHEETS—SHEET 4.
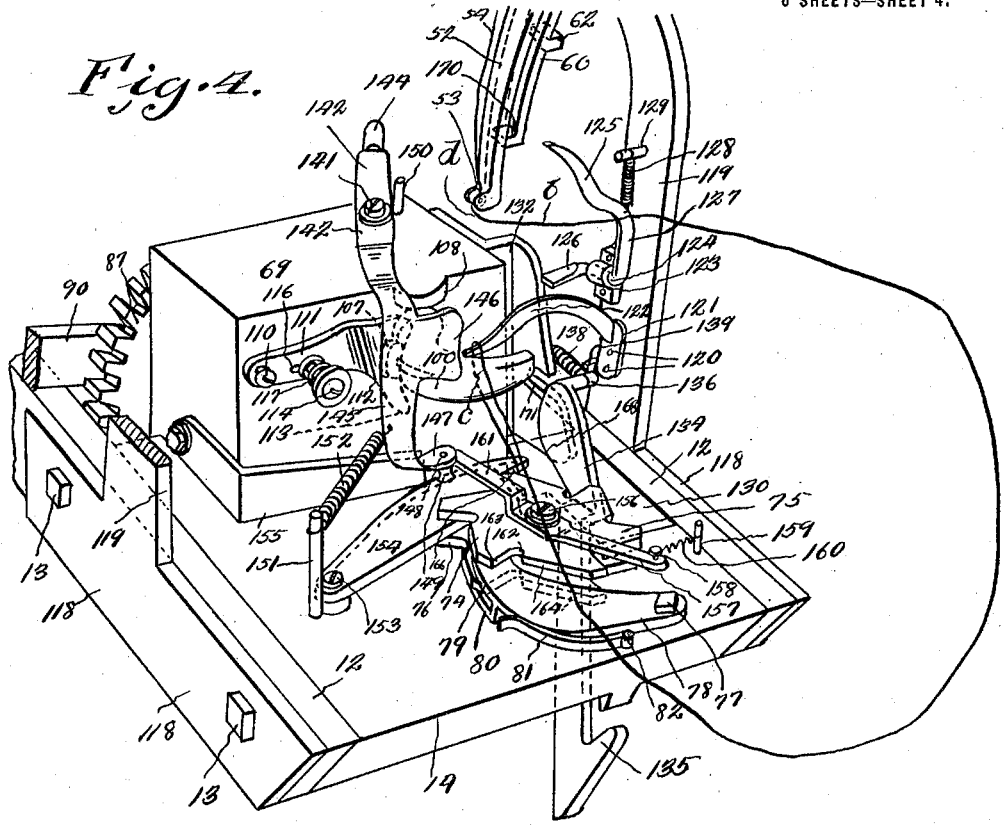
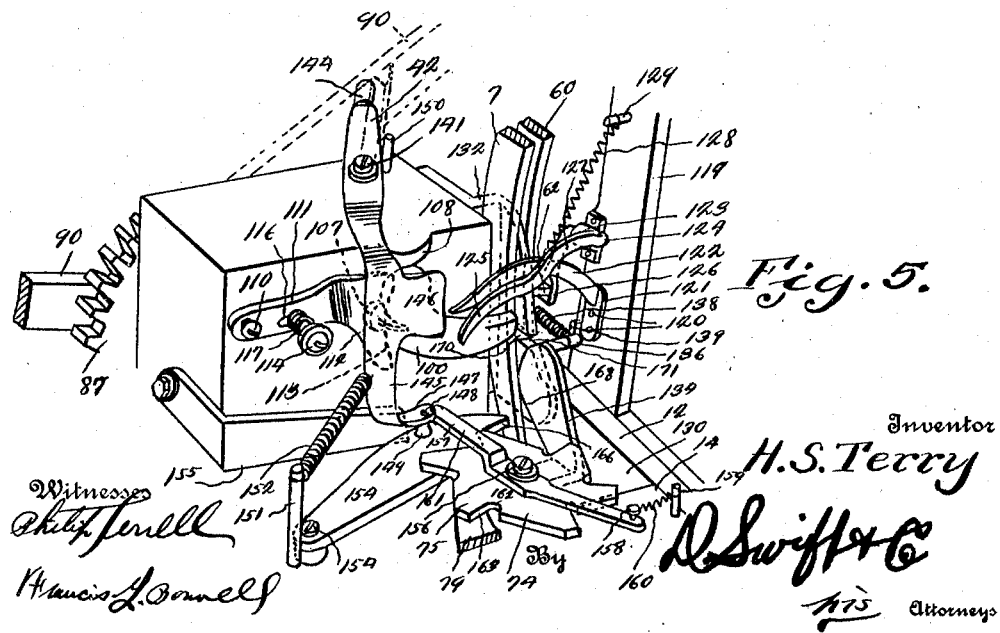
Inventor
H. S. Terry

H. S. TERRY.
HAND BUNDLE TYING MACHINE.
APPLICATION FILED SEPT. 12, 1918.

1,316,002.

Patented Sept. 16, 1919.
6 SHEETS—SHEET 5.

Inventor
H. S. Terry

Witnesses

H. S. TERRY.
HAND BUNDLE TYING MACHINE.
APPLICATION FILED SEPT. 12, 1918.

1,316,002.

Patented Sept. 16, 1919.
6 SHEETS—SHEET 6.

Inventor
H. S. Terry
By D. Swift & Co.
his Attorneys

Witnesses

UNITED STATES PATENT OFFICE.

HARRY SUMLER TERRY, OF COURTLAND, KANSAS.

HAND BUNDLE-TYING MACHINE.

1,316,002.            Specification of Letters Patent.    Patented Sept. 16, 1919.

Application filed September 12, 1918. Serial No. 253,764.

*To all whom it may concern:*

Be it known that I, HARRY S. TERRY, a citizen of the United States, residing at Courtland, in the county of Republic, State of Kansas, have invented a new and useful Hand Bundle-Tying Machine; and I do hereby declare the following to be a full, clear, and exact description of the invention, such as will enable others skilled in the art to which it appertains to make and use the same.

This invention relates to an improved bundle-tying machine.

As one of the objects of the invention it is the aim to provide an improved machine of this kind which is hand operated, and adapted for facilitating the tying of bundles of corn stalks, wheat, hay and the like.

A further object of the invention is to improve, simplify and render more practical the construction of the hand bundle tying machine set forth, illustrated and claimed in the patent to H. S. Terry, July 30, 1918, Patent No. 1,274,210.

A further object of the invention is to provide a bundle tying device provided with means for drawing the bundle compact and tight, while binding the cord or twine about the bundle.

A further object of the invention is to provide bundle compacting jaws carried by an actuating lever, in combination with a spring tensioned bundle supporting base, on which one of the jaws cams, when the actuating lever is operated, so as to squeeze and compact the bundle.

A further object of the invention is to provide means for holding the bundle supporting base in a raised position against its spring tensioning means, while the bundle is being compact.

A further object of the invention is to provide improved means adapted to be operated for releasing the bundle supporting base.

A further object of the invention is to provide a cutting device for the twine or cord, to be actuated by a second operating lever, and which cutting device in turn operates the holding means to release the bundle supporting base.

A further object of the invention is the provision of improved means for holding the loop end of the twine in position on the knot tying horn as the knot is being tied.

A further object of the invention is to provide a spring tensioned device of improved form for disengaging the knot from the knot tying horn after cutting the twine, said spring tensioned device being operated by the second operating lever.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the improved bundle tying machine constructed in accordance with the invention, showing the casing for the knot tying and severing mechanism removed, and showing the main operating lever in an open position, and the twine or cord in a loop form ready to receive a bundle of hay, wheat or the like.

Fig. 2 is a view in side elevation showing the operating lever closed, so that its needle end may dispose a loop end of the cord or twine in position for tying the knot.

Fig. 3 is a plan view of the improved bundle tying machine, that is a plan view of Fig. 2 showing the casing for the knotting and severing mechanism, there being a slot or opening in said casing for the reception of the needle end of the operating lever.

Fig. 4 is a view in perspective of the improved knot tying and severing mechanism constructed in accordance with the invention.

Fig. 5 is a view in perspective of a portion of the knot tying and severing mechanism, showing the needle end of the operating lever in a position for placing the loop end of the cord or twine, which is carried by the needle end, in position to be knotted by the knot tying horn.

Fig. 8 is a view in elevation of one side of the knot tying mechanism, showing the second operating lever and the gear connections for operating the knot tying horn.

Fig. 9 is a sectional view on line 9—9 of Fig. 6.

Fig. 10 is a sectional view on line 10—10 of Fig. 9.

Figure 1:
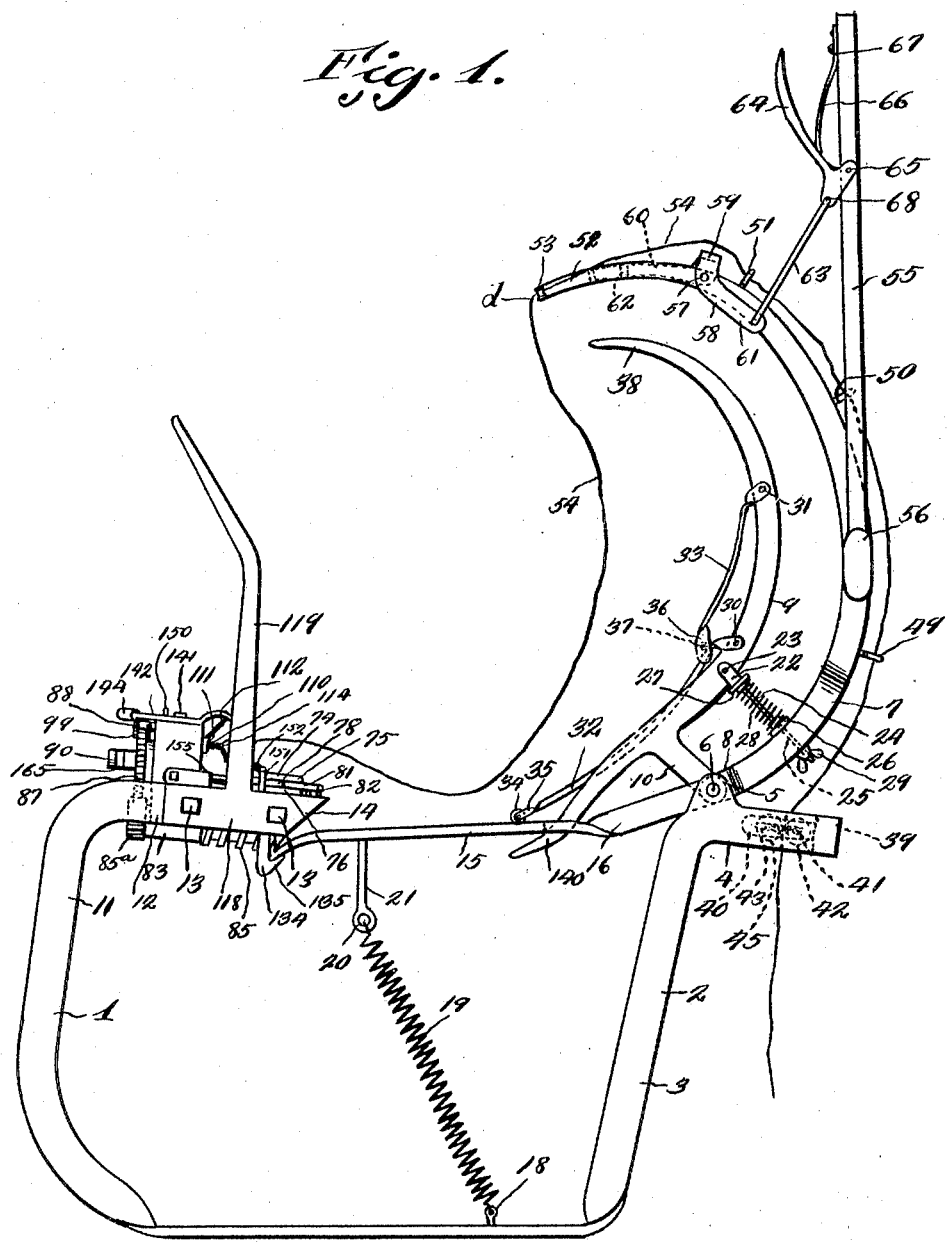

Referring more especially to the drawings, 1 designates a suitable frame, which may be any conventional form or construction, preferably as shown in Figs. 1, 2 and 3. In this case the frame comprises the side bars 2, which are preferably U-shaped as shown. The rear uprights 3 of the side bars converge upwardly and toward each other and terminate in the lateral parallel spaced arms 4 provided with ears 5, for the reception of the bolt 6. An operating lever 7, which may be any suitable shape preferably curved as shown, is provided. The forked end 8 of the lever is pivotally mounted upon the bolt 6. Also mounted pivotally upon the bolt 6 is an additional lever 9, the arm 10 forming a connection between the pivot or bolt 6 and said lever 9. The arm 10 engages between the forks of the lever 7. The uprights 11 of the frame 1 terminate in the lateral arms 12, which are secured by means of bolts 13 to the opposite edges of a base 14 on which the knot tying mechanism to be subsequently described is mounted. A bundle supporting base 15, as shown clearly in Figs. 1, 2 and 3 is provided. One end of this bundle supporting base terminates in spaced forks 16, which are pivotally mounted upon the bolt 6, said forks 16 engaging between the ears 5 and the outer faces of the forks of the lever 7. An eye 18 is carried by the lower portion of one of the side bars of the frame 1, and connected to the eye is a coil spring 19. This coil spring 19 is connected to an eye 20 of a depending arm 21 of the bundle supporting base 15. It is obvious that the spring 19 may be connected directly to the bundle supporting base 15 if desired. It is to be noted that the bundle supporting base 15 is detachably supported at one end, when in position as shown in Figs. 1 and 2, and when said bundle supporting base is released the spring 19 will automatically throw the base downwardly. A U-shaped connector 22 is pivoted at 23 to the lever 9, and a suitable rod 24 is swiveled in any suitable manner (not shown) to the connector 22, and passes through an opening 25 of the lever 7. A shouldered collar 26 is slidably mounted upon the rod 24 and is disposed adjacent one edge of the lever 7. The connector 23 has an integral collar 27. Interposed between the collar 27 and the shoulder of the collar 24 is a coil spring 28, thereby keeping the two levers 7 and 9 in proper spaced relations, as clearly shown in Figs. 1 and 2. By adjusting the wing-nut 29 which is threaded on the rod 24, it is obvious that the lever 9 may be adjusted in its spaced relation with respect to the lever 7. It is further obvious that should the bundle to be tied be of considerable size in diameter the lever 9 will yield, bearing back upon the coil spring 28. Also by adjusting the wing-nut 29, the tension of the spring 28 may be increased or decreased. Pivoted at 30 on the lever 9 and also at 31 are bundle compacting jaws 32 and 33, which are slightly curved and which may be any suitable shape desired. These jaws are actuated when the lever 9 is moved. In fact the jaw 32 falls by gravity until its roller 34, (which is mounted upon a pin between the forks 35) contacts with the bundle supporting base 15. The bundle compacting jaw 33 has forks 36, between which a roller 37 is mounted, the forks 37 engaging on the opposite sides of the bundle compacting jaw 32. It is obvious that the jaw 33 falls by gravity, sufficiently whereby the roller 36 may at all times cam upon the jaw 32. For instance when the twine or cord for binding the bundle is arranged in position as shown in Fig. 1, and the bundle of hay or the like placed in the loop of the cord or twine so as to be supported by the base 15, the lever 7 may then be actuated. When the lever 7 is moved to the position shown in Fig. 2 the lever 9 is likewise moved, and if the bundle is thick the spring 28 will yield. The curved end 38 of the lever 9 will reach over the bundle in a direction toward the knotting mechanism base 14. When the lever 9 is moved, the jaw 32 will slide under the bundle, the roller 34 camming on the base 15, while the jaw 33 will bear against the side of the bundle opposite the extremity 38, the roller 37 camming on the jaw 32, as shown clearly in Fig. 2, so as to tightly compact the bundle to be tied. A casting 39 is fastened in any suitable manner between the ends of the arms 4, and projecting from and integral with said casting 39 is a pair of parallel spaced arms 40. Journaled in said arms is a pin 41, on which a serrated roller 42 is fixed. Said arms 40 are provided with elongated slots 43, and engaging said slot is a pin 44. Rotatable on the pin 44 is a serrated roller 45. A pair of coil springs 46 are connected to the ends of the pin 44, and have their other ends connected at 47 to the casting 39, and by means of the tension of said spring, and since the pin 44 is loose in the slots 43, the serrated roller will be held yieldably against the serrated roller 42. Said rollers 42 and 45 are provided with slight annular depressions or grooves 48, between which the cord or twine engages. These depressions or grooves are of just sufficient depth to hold the cord or twine centrally between the rollers, and the yieldably mounted roller 45 is designed to bear or bite sufficiently on the cord to hold the same taut, and to prevent the cord or twine from becoming slack between the location of the rollers and the needle end of the lever 7. A suitable ball of cord or twine (not shown) is designed to be used, and the cord passes from the ball between the rollers, and through the several eyes 49, 50 and 51, which are carried by the lever 7. Said lever has its needle end 52 provided with an eye 53, through which the cord or twine 54 passes. A handle 55 is fixed in any suitable manner, for instance integrally as at 56 to the lever 7, and pivoted at 57 a short distance from the needle end of the lever 7 is a lever 58. This lever 58 is constructed from a single piece of sheet metal bent upon itself to form a U-shaped portion 59, which straddles the lever 7 and receives the pivot 57. By this construction the lever 58 is provided with a pair of arms 60 and 61, one arm 60 is on one side of the lever 7 and the other arm 61 is adjacent the opposite face of the lever 7. The arm 60 has a lateral lug 62, and a link 63 is pivoted to the other arm 61. A hand grip 64 is pivoted at 65 to the handle 55, there being a leaf spring 66 secured at 67 in any suitable manner to the handle, and in turn bears against the hand grip 64, to hold it normally in the position shown in Fig. 1. The link 63 is pivotally connected at 68 to the body of the hand grip. However, by gripping the hand grip 64, it is obvious that the lever 58 may be tilted on its pivot for the purpose to be subsequently stated. The base 14 has an upwardly extending right angle portion 69.

Figure 6:
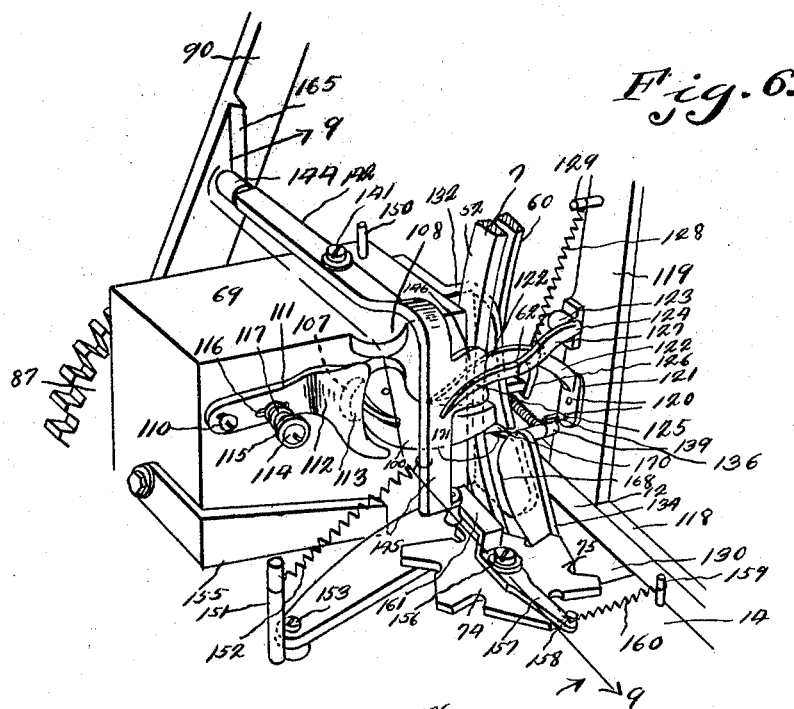
Fig. 6 is a perspective view of a portion of the knot tying mechanism, showing the operating parts thereof in their assumed positions after the knot has been tied, and a member in position in the act of disengaging the knot from the knot tying horn.
Figure 7:
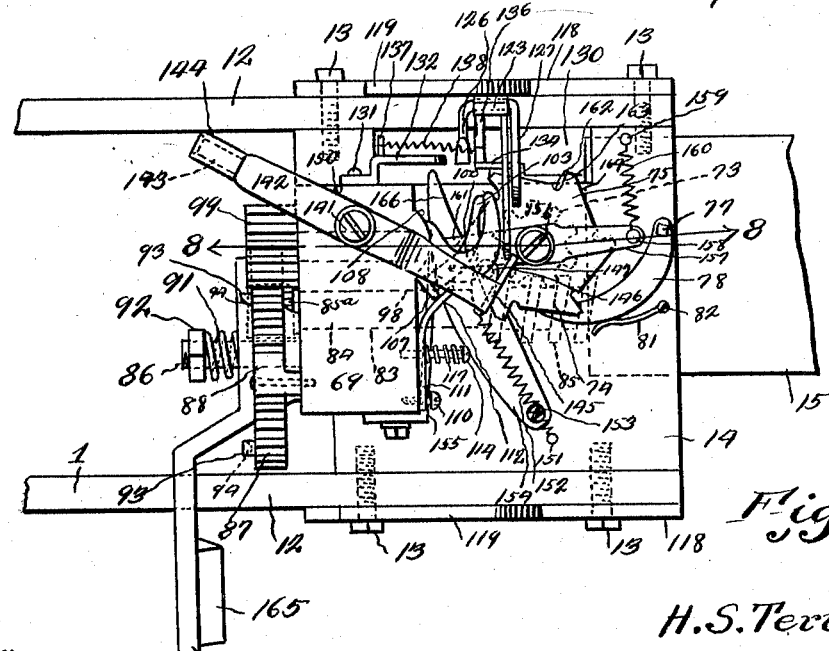
Fig. 7 is a plan view of the knot tying mechanism, the parts thereof being in the same position as disclosed in Fig. 4.
Figure 11:
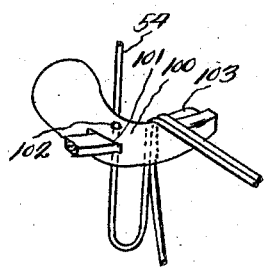
Fig. 11 is a view in perspective showing the first step in forming the knot in the binding cord or twine.
Figure 12:
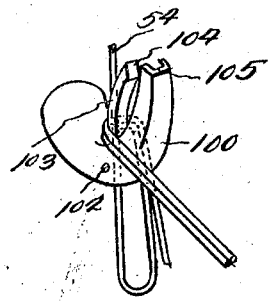
Fig. 12 is a perspective view showing the second step in forming the knot.
Figure 13:
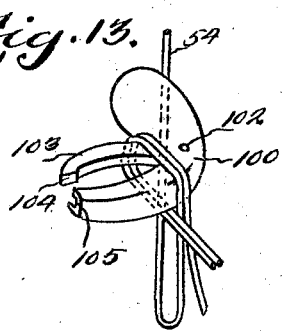
Fig. 13 is a perspective view showing the third step in forming said knot.

Mounted in a bearing 70 of the base 14 is a shaft 71, and fixed or pinned at 72 to the lower end of the shaft 71 is a worm gear 73, and formed integral with or otherwise connected to the upper end of the shaft 71 is a disk member 74 having upper and lower spaced circular flanges 75 and 76. Pivoted at 77 to the upper face of the base 14 is a lever 78, which is provided with spaced forks 79 and 80. Fork 79 engages between the flanges 75 and 76 and the fork 80 engages below the flange 76, there being a leaf spring 81 connected at 82 to the base 14 and bearing against the lever 78, whereby said forks 79 and 80 may bear frictionally against the cylindrical surface of the disk member 74, thereby preventing the disk member from rotating excessively, and at the same time guide the same, owing to the fact the forks 79 and 80 straddle the lower flange 76. Mounted in a suitable bearing 83 of the under face of the base 14 is a shaft 84, provided with a worm 85 at one end meshing with the worm gear 73. The other end of the shaft 84 has a gear 85. Extending from the right angle extending upright of the base 14 is a stud 86, on which a gear 87 is loosely mounted, there being a pawl 88 (which is gravity actuated) pivoted at 89, and designed to engage the teeth of the gear 87, to prevent retrograde movement in the direction of the arrow $a$. Also loosely pivoted on the stud 86 is a second operating lever 90, there being a coil-spring 91 interposed between the lever 90 and a nut 92 (which is threaded upon the stud 86) to bear yieldably against the lever, to hold in engagement with the outer face of the gear 87. The outer face of the gear 87 is provided with a plurality of lugs 93, which have bevel portions 94. Near the pivoted end of the lever 90 an angle edge 95 is formed and this edge is provided with an adjoining bevel 96. It is to be observed that the lever 90 when moved upon its pivot will impart an intermittent motion to the gear 87. For instance the edge 97 of the lever will contact with one of the lugs 93, and move the gear 87 a certain distance, and since the gear 87 is in mesh with the gear $85^a$, the shaft 84 will rotate, and in turn impart movement to the vertical shaft 71, through the medium of the worm and worm gear, and thereby rotate the disk member 74. When the lever 90 is moved in the opposite direction, the bevel 96 will cam upon the bevel 94 of the next lug 93, and it is obvious that since the spring 91 bears yieldably against the lever, the lever will cam over the lug, so that its edge 97 may engage the lug in the manner previously set forth. Also mounted in a bearing of the right angle extending upright is a shaft 98 provided with a gear 99 on one end, and which gear meshes with the gear 87. The other end of the shaft 98 terminates in a knot tying horn 100, and the functions of which are identical with those of a similar member set forth and claimed in the hereinbefore specified patent. However, this knot tying horn is in the form of a hook or a lateral projection, and is provided with a slot 101. Pivotally mounted in the slot 101 and on the pin 102 is a lever or oscillatory member 103. One end portion of the member or lever 103 is provided with a lateral tooth 104. One face of the knot tying horn has an elongated recess 105 for the reception of the tooth 104 and partial reception of one end portion of the lever or member 103, that is, when the end carrying the tooth 104 is closed. The other end of the lever or member 103 has an extension 106, which carries a disk roller 107. The upstanding right angle portion 69 has a cam lug 108, with which said disk roller 107 contacts at a certain time when the knot tying horn is rotated, so as to throw the lever or member 103 open so as to release the cord or twine, which is held in the groove or channel 105 of the knot tying horn during a period of tying the knot, as shown clearly in Fig. 15. Pivotally mounted upon a screw stud 110 loosely as shown in Fig. 6 is a plate 111, which is provided with a lateral portion 112. This lateral portion 112 terminates in an elongated curved cam 113, against which the disk roller 107 contacts, to hold the lever or member 103 closed, during the greater portion of the movement of the knot tying horn. A screw stub 114 projects laterally from the upstanding right angle portion 69 and through the plate 111 and is provided with a washer 115 adjacent its head. Where the screw stub extends through the plate 111 an elongated slot 116 is formed, and interposed between the plate 111 and the washer 115 is a coil spring 117, so as to hold the plate 111 in contact with one face of the right angle upstanding portion 69. It is obvious that when the disk roller 107 is in contact with the cam 113, said cam yields, owing to the spring 117. Also secured by the screw bolts 13 adjacent the arms 12 are plates 118, and rising upwardly from the edges of said plates are guard arms 119. Secured at 120 to one of the guard arms 119 is a plate 121 provided with a guard finger 122, which extends in a direction toward the knot tying horn and over which an end portion of the twine or cord engages, when the horn is in its normal position as shown in Fig. 4. Mounted in a bearing 123 rockably is a shaft 124, one end of which terminates in an upwardly and laterally extending finger 125. The other end of the shaft 124 terminates in a lateral arm 126, which extends at right angles to the upward or vertical part 127 (which lies in parallelism with the guard arm 119) of the finger 125. A coil spring 128 has one end connected to the finger 125, and its other end to a pin 129 of the guard arm. The lateral arm 126 of the shaft 124 is positioned normally in the path of the lug 62 of the lever 58 by virtue of the spring 128, that is, when the lever 7 is in the act of moving toward the position shown in Fig. 2. The base 14 near one side has an opening 130, through which the needle end of the lever 7 extends. Secured at 131 to one of the side faces of the upright right angles extending portions 69 of the base 14 is an angle guard plate 132 which guides the needle end of the lever with the cord or twine in the eye 53 down through the opening 130, and when the lever is in the act of moving toward the position shown in Fig. 2, in fact when the needle end of the said lever 7, it is partially engaging between the guard plate 132 and the upright portion 69 of the base 14, the lug 62 of the lever 58 will contact with the arm 126, thereby rocking the shaft 124 against the action of the spring 128. When the shaft 124 is so rocked, the finger 125 will engage the portion $b$ of the cord or twine and hold the same over the finger 122, adjacent the portion $c$ of the cord or twine, so that the knot can be properly tied by the horn. Pivoted to one wall of the opening 130 of the base 14 on a stud 133 is a lever 134, the lower end of which has a cam hook 135, and its other end is provided with a lateral lug 136, between which and a pin 137 (which extends from the guard plate 132) is a tension coil spring 138, to hold the lug 136 normally in contact with the projection 139 of the plate 121. One end of the bundle supporting base 15 engages the cam hook 135, to hold the bundle supporting base in the position shown in Fig. 1. However, when the lever 134 is actuated to release the bundle supporting base, the spring 19 throws said base downwardly. Owing to the extension 140 of the lever 9 being located between the forks 16 of the bundle supporting base, said extension 140 will engage under the bundle supporting base and restore it to its initial position shown in Fig. 1, that is, when the lever 7 is moved to an open position as shown in Fig. 1. Pivoted on the screw stud 141 of the upright 69 is a lever 142, an extension 143 of which at one end, is provided with a roller 144. The other end of the lever 142 extends downwardly and overlies the cam portion 113 of the plate 111. The downwardly extending part 145 of the lever 142 is provided with a projection 146, which extends substantially in the direction of the finger 122. The lower end of the downwardly extending part 145 of the lever 142 has a lateral lug 147, on a pin 148 of which a grooved roller 149 is journaled. An abutment lug 150 rises upwardly from the upright portion 69 against which one end of the lever 142 contacts normally. Rising upwardly from the base 14 is a pin 151 between which and the downwardly extending part 145 of the lever 142 a coil spring 152 connects. Pivoted on a screw stud 153 of the base 14 is an abutment lever 154, which extends between the flanges 75 of the disk member 74, there being a leaf spring 155 bearing against one edge of the abutment lever 154 to hold its other edge in contact with the lever 78, as shown clearly in Fig. 10. The combined tension of the springs 81 and 155 bearing respectively upon the levers 78 and 154 insure sufficient friction between the lever 78 and the cylindrical surface of the disk member 74 to prevent the disk member from rotating excessively, when moved or rotated intermittently. Pivoted upon the screw stud 156 (which is threaded into the disk member 74) is a cutting knife or cord severing device 157. One end of the severing device or knife has a pin 158 between which and the pin 159 a tension spring 160 connects so as to hold the back edge of the cutting end 161 while normally in contact with the roller 149 of the lug 147. The marginal edges of the flanges 75 of the disk or member 74 are provided with recesses 162, and adjoining radial shoulders 163. Said flanges 75 of the disk 74 also have bevel parts 164 which adjoin the recesses 162 and are at right angles to the radial shoulders 163. The second operating lever 90 is provided with a cam projection 165.

Figure 14:
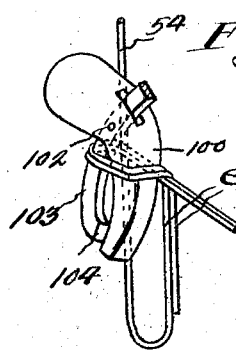
Fig. 14 is a perspective view showing the fourth step for tying the knot.
Figure 15:
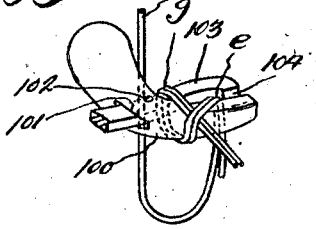
Fig. 15 is a perspective view showing the fifth step.
Figure 16:
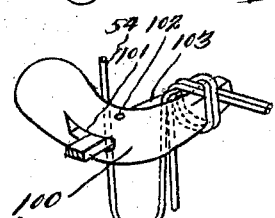
Fig. 16 is a perspective view illustrating the sixth step.
Figure 17:
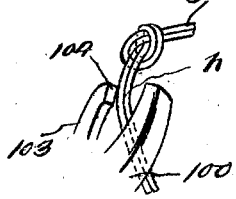
Fig. 17 is a perspective view showing the seventh and final step in completing the formation of the knot.

In tying a bundle of hay or the like, the twine or cord is first arranged as shown in Fig. 1, the levers 7 and 9 being open, the cord passing through the several eyes 49, 50 and 51 and through the needle eye 53. The end of the cord or twine is placed over the finger 122 and over the knot tying horn, as shown clearly in Fig. 4. The lever 7 is then moved to the position shown in Fig. 2, so as to compact the bundle of hay or the like. When the levers 7 and 9 are moved to these positions, it will be noted that the loop of the cord or twine is around the bundle, the eye end of the needle having fed the portion $d$ of the cord or twin downwardly between the edge 166 of the abutment lever 154 and one of the radial shoulders 163, after which the second operating lever 90 is oscillated upon its pivot. The moving of the lever 90 causes its edge 97 to contact with one of the lugs 93 of the gear 87, and through the gear connections the vertical shaft 71 is partially rotated, moving the disk 74, whereby the shoulders 163 (between which and the edge 166 the cord or twine at $d$ is positioned) toward the edge 166, thereby gripping and holding the cord. When the portion $d$ of the cord is thus gripped, the end of that portion of the cord $c$ that lies over the finger 122 and the knot tying horn is also gripped. Also when moving the second operating lever 90, the knot tying horn is rotated, the lever or member 103 remaining closed, until the disk roller 107 disengages from the cam 113. However, when the disk roller disengages from the cam, said member or lever 103 opens, by gravity, since the end of the lever or member 103 carrying the disk roller 107 is the heaviest. After the lever or member 103 opens in this manner, the tooth 104 of the lever or member 103 rides upon the cam 113, so as to hold the lever or member 103 open, so as to spread or enlarge the loops of the cord or twine, as shown in Fig. 14. About the time that the tooth is disengaging from the cam 103 the disk roller 107 is on the verge of contacting with the cam lug 108, so as to still hold the lever or member 103 open, so that the portions $e$ of the cord or twine as shown in Fig. 14 may enter between the knot tying horn and the lever or member 103, as shown in Fig. 15. When the knot is thus far tied, the operating lever 90 has completed its movement to the other side of the base 14, until it is limited by one of the arms 12, that is, the arm 12 beyond and below the roller 144 of one end of the lever 142. The operating lever 90 is then moved backwardly toward its original position and when so moving the cam projection 165 cams upon the roller 144, and oscillates the lever 142. The moving of the lever 142 causes the projection 146 to pass between the two fingers 125 and 122, so as to remove the loops $g$ of the cord or twine off of the knot tying horn and the lever or member 103. The act of moving these loops $g$ off the knot tying horn and the lever 103, particularly since the lever or member 103 is closed, will cause the loops $g$ to pass over the portions $e$ of the cord or twine. In other words the portions $e$ of the cord or twine will be pulled through the loops $g$, as shown in Fig. 16, and when the cord or twine is completely removed from the knot tying horn, and the portions $h$ of the cord or twine are released by the opening of the lever or member 103, the knot is completely tied. However, just at the time the knot is completely removed from the knot tying horn, the lever 42 having been operated to perform this function, the roller 149 has cammed against the back edge of the cutting end of the knife and moved or oscillated the cutting knife, so that the cutting edge will cut the cord or twine below the knot against the edge portion 168 of the lever 134. The cutting end of the knife has a blunt portion, which also bears against the portion 168 of the lever 134, and upon further movement of the lever 142, through the medium of the lever 90, said lever 134 is actuated, whereby its cam hook 135 will release the bundle supporting base 15, allowing the base to drop through the medium of the tension of the spring 19. When this base is released, the bundle will be dropped therebelow. The base may be restored to its initial position by opening the lever 7. To open the lever 7, to restore the finger 125 to its initial position, the hand grip 64 is depressed toward the handle 65, which will oscillate the lever 58, which will remove the lug 62 from the path of the arm 126 of the shaft 124.

Through the action of the spring 128 the shaft 124 will rock, and the finger 125 will assume its initial position shown in Fig. 4. Also when depressing the hand grip toward the handle 55, the lug 170 will be disengaged from the slot 171 of the flange of the guard plate 132, to permit the lever 7 to be open. In so opening the lever 7, the eye end of the needle will cam past the edge 166 of the abutment lever 154. The operation of the knot tying horn is substantially the same as that embodied in the foregoing named Patent, No. 1,274,210, and it is obvious that the various steps in tying the knot as illustrated in Figs. 11 to 17 inclusive are substantially the same as those in said patent.

The invention having been set forth what is claimed as new and useful is:—

1. In a machine as set forth, a frame, a knot tying mechanism supported on one end thereof, an operating cord feed lever pivotally mounted on the other end of the frame, a yieldable bundle compacting lever carried by the pivot of the operating lever and provided with bundle compacting jaws, for compacting the bundle.

2. In a machine as set forth, a frame, a knot tying mechanism supported on one end thereof, an operating cord feed lever pivotally mounted on the other end of the frame, a yieldable bundle compacting lever carried by the pivot of the operating lever and provided with bundle compacting jaws, for compacting the bundle, a pivoted bundle supporting base against which one of said jaws cam for compacting the bundle.

3. In a machine as set forth, a frame, a knot tying mechanism supported on one end thereof, an operating cord feed lever pivotally mounted on the other end of frame, a yieldable bundle compacting lever carried by the pivot of the operating lever and provided with bundle compacting jaws, for compacting the bundle, a pivoted bundle supporting base against which one of said jaws cam for compacting the bundle, and means for detachably supporting said bundle supporting base and adapted to be actuated to release said base.

4. In a bundle tying machine, the combination with a frame, of a bundle supporting base pivoted on one end of said frame, means for detachably supporting the other end of said base, and a mechanism for actuating said means whereby the base may be released.

5. In a bundle tying machine, the combination with a frame, of a bundle supporting base pivoted on the end of said frame, means for detachably supporting the other end of said base, and a mechanism for actuating said means whereby the base may be released, and means for throwing the base downwardly.

6. In a bundle tying machine, the combination with a frame, of a bundle supporting base pivoted on the end of said frame, means for detachably supporting the other end of said base, and a mechanism for actuating said means whereby the base may be released, and means for throwing the base downwardly, and means for restoring the bundle supporting base in engagement with its holding means.

7. In a hand operated bundle tying machine, the combination with a frame, of a bundle supporting base fulcrumed on one end of said frame, detachable holding means for the other end of said base, a yieldable lever fulcrumed on the frame and provided with bundle compacting jaws, one coöperating with the other, and the latter coöperating with the base to compact the bundle on the base.

8. In a hand operated bundle tying machine, the combination with a frame, of a bundle supporting base fulcrumed on one end of said frame, detachable holding means for the other end of said base, a yieldable lever fulcrumed on the frame and provided with bundle compacting jaws, one coöperating with the other, and the latter coöperating with the base to compact the bundle on the base, said lever having means to restore the bundle supporting base to its initial position subsequently to the base having been released.

9. In a bundle tying machine, the combination with a frame, of a bundle supporting base fulcrumed on one end of said frame, holding means for the other end of said base, a mechanism for actuating said means to release the base, spring tensioning means for the base, and a device for restoring said base in engagement with its holding means.

10. In a hand operated bundle tying machine, the combination with a frame, of a knotting mechanism on one end of the frame of a bundle supporting base fulcrumed on the other end of the frame, detachable holding means for one end of the base, a cord or twine feed lever to feed the cord into the knotting mechanism, and a bundle compacting lever pivoted on the frame and yieldably connected to the feed lever, for compacting the bundle on the base.

11. In a hand operated bundle tying machine, the combination with a frame, of a knotting mechanism on one end of the frame of a bundle supporting base fulcrumed on the other end of the frame, detachable holding means for one end of the base, a cord or twine feed lever to feed the cord into the knotting mechanism, and a bundle compacting lever pivoted on the frame and yieldably connected to the feed lever, for compacting the bundle on the base, means carried by the knotting mechanism for actuating the base holding means to release the base, means carried by the bundle compacting lever to restore the base in engagement with the holding means.

12. In a hand operated bundle tying machine, the combination with a frame, of a knotting mechanism on one end of said frame, a lever having a cord feed needle to feed the cord to the knotting mechanism, means for locking the needle in engagement with the knotting mechanism.

13. In a hand operated bundle tying machine, the combination with a frame, of a knotting mechanism on one end of said frame, a lever having a cord feed needle to feed the cord to the knotting mechanism, means for locking the needle in engagement with the knotting mechanism, and means for releasing said locking means.

14. The combination with a frame, of a bundle supporting base, a member pivoted on the frame, and bundle compacting jaws pivoted in the member, one coöperating with the other and the latter with the base, for compacting a bundle.

15. In a hand operated bundle tying machine, the combination with a frame, of a knotting mechanism on one end of said frame, said mechanism comprising a knot tying device, stationary and movable fingers for holding the cord over the knot tying device, an operating lever having a needle end to feed the cord to the mechanism, said needle having means for operating the movable finger.

16. In a hand operated bundle tying machine, the combination with a frame, of a knotting mechanism on one end of said frame, said mechanism comprising a knot tying device, stationary and movable fingers for holding the cord over the knot tying device, an operating lever having a needle end to feed the cord to the mechanism, said needle having means for operating the movable finger, and means for locking the needle end of the lever in engagement with the knotting mechanism.

17. In a hand operated bundle tying machine, the combination with a frame, of a knotting mechanism on one end of said frame, said mechanism comprising a knot tying device, stationary and movable fingers for holding the cord over the knot tying device, an operating lever having a needle end to feed the cord to the mechanism, said needle having means for operating the movable finger, and means for locking the needle end of the lever in engagement with the knotting mechanism, and a device carried by the lever and connected to said means on the needle end for operating said means, whereby the finger may be released and the needle end unlocked.

18. In a hand operated bundle tying machine, the combination with a frame, of a bundle supporting base supported on one end of the frame, a knot tying mechanism on the other end of the frame, a spring tensioned device for detachably supporting the free end of said base, said knotting mechanism having a revoluble knot tying device, a spring tensioned severing member, a spring tensioned element adapted to actuate said severing member, which in turn actuates the spring tensioned device for releasing the bundle supporting base, and an operating lever having geared connections with the knot tying device for actuating the same and provided with means for actuating said spring tensioned element.

19. In a hand operated bundle tying machine, the combination with a frame, of a bundle supporting base supported on one end of the frame, a knot tying mechanism on the other end of the frame, a spring tensioned device for detachably supporting the free end of said base, said knotting mechanism having a revoluble knot tying device, a spring tensioned severing member, a spring tensioned element adapted to actuate said severing member, which in turn actuates the spring tensioned device for releasing the bundle supporting base, and an operating lever having geared connections with the knot tying device for actuating the same and provided with means for actuating said spring tensioned element, a stationary finger over which and over the knot tying device one portion of the cord is adapted to be disposed for tying the knot, a movable finger to be actuated for disposing another portion of the cord over the stationary finger and over the knot tying device, and means carried by the spring tensioned element passed between the fingers to remove the cord from the knot tying device subsequently to tying the knot.

20. The combination with a frame, of a bundle suporting base fulcrumed on one end of the frame, a knot tying mechanism on the other end of the frame and provided with a base, a spring tensioned lever carried by the base of the knotting mechanism for detachably supporting the bundle supporting base, a severing device spring tensioned, and a spring tensioned element adapted to be actuated to operate said severing device for cutting the cord after tying the knot, said severing device in turn adapted to engage said spring tensioned lever, to actuate the same and release the bundle supporting base.

21. The combination with a frame, of a bundle supporting base fulcrumed on one end of the frame, a knot tying mechanism on the other end of the frame and provided with a base, a spring tensioned lever carried by the base of the knotting mechanism for detachably supporting the bundle supporting base, a severing device spring tensioned, and a spring tensioned element adapted to be actuated to operate said severing device for cutting the cord after tying the knot, said severing device in turn adapted to engage said spring tensioned lever, to actuate the same and release the bundle supporting base, said knotting mechanism having a knot tying device, a pair of members for holding the cord over the knot tying device while the knot is being tied, and means carried by the element to pass between said members for removing the knot from the knot tying device.

In testimony whereof I have signed my name to this specification in the presence of two subscribing witnesses.

HARRY SUMLER TERRY.

Witnesses:
S. J. SNIDER,
C. B. McKAY.

Copies of this patent may be obtained for five cents each, by addressing the "Commissioner of Patents, Washington, D. C."